C. HERING.
METHOD OF AND MEANS FOR INCREASING POWER FACTOR.
APPLICATION FILED JUNE 18, 1914.
1,389,354. Patented Aug. 30, 1921.
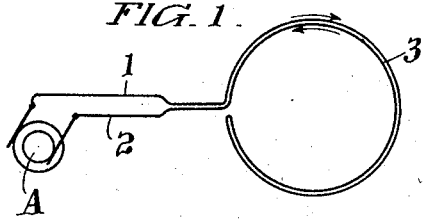
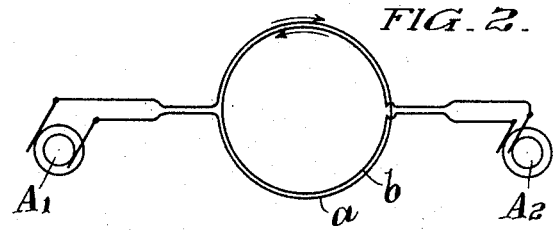
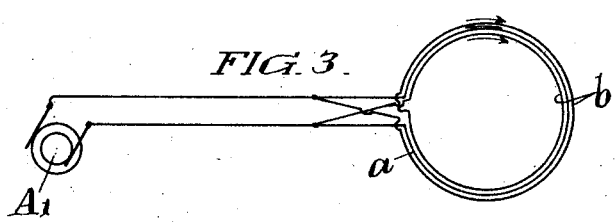
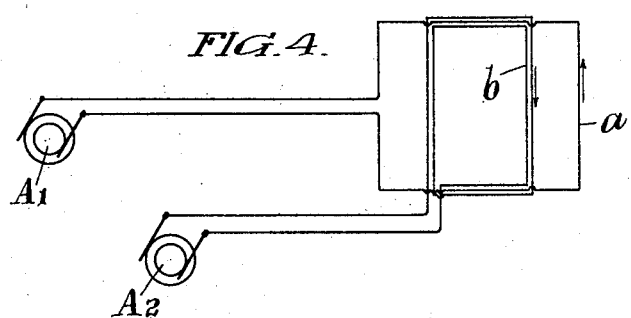
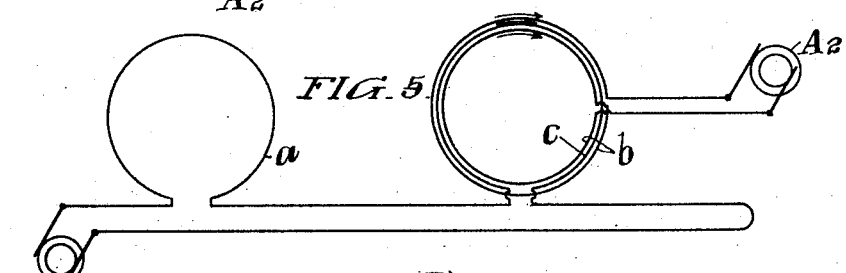
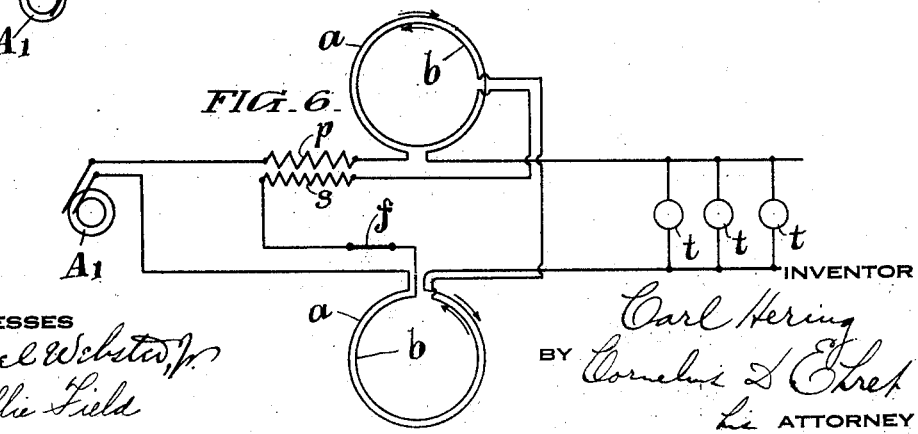

UNITED STATES PATENT OFFICE.

CARL HERING, OF PHILADELPHIA, PENNSYLVANIA.

METHOD OF AND MEANS FOR INCREASING POWER FACTOR.

1,389,354.  Specification of Letters Patent.  Patented Aug. 30, 1921.

Application filed June 18, 1914. Serial No. 845,773.

*To all whom it may concern:*

Be it known that I, CARL HERING, a citizen of the United States, residing in the city of Philadelphia and State of Pennsylvania, have invented certain new and useful Improvements in Methods of and Means for Increasing Power Factor, of which the following is a specification.

My invention relates to a method of and apparatus for counteracting the undesirable effects of inductance in an alternating current circuit.

It is well understood that inductance in such an electric circuit causes a phase displacement between the impressed electromotive force and the resultant current, commonly referred to as the lag of the current behind the electro-motive force, and this lag lowers the power factor of the circuit, in such case the power factor being less than unity and equal to the cosine of the angle of phase displacement between the electromotive force and current. By my invention this lagging of the current behind the electro-motive force, or the phase displacement between electro-motive force and current, is reduced, that is, the power factor is caused to increase in order to more closely approximate unity.

While this general result has heretofore been produced by the effect of a condenser connected in the circuit or by a synchronous motor connected to the circuit and having its field over excited, the condenser method is impracticable for high power circuits and the synchronous motor method is expensive and involves a dynamo electric machine having a rotating element. My invention, however, is applicable to high power circuits, does not necessarily involve machinery having rotating parts, is simple and relatively inexpensive.

My invention resides in the method of and means for increasing the power factor of a main circuit by placing in coöperative relation with such circuit and close thereto a coil, loop, winding or conductor producing ampere turns in such quantity with current in such phase relation with respect to the current in the main circuit as to bring the current and impressed electro-motive force of the main circuit more closely into phase with each other.

In accordance with my invention there is placed close to the coil or part which produces the inductance, a balancing coil or conductor having substantially the same number of ampere turns as the former and tending to produce a magneto-motive force substantially equal and opposite to the magneto-motive force generated by the inductance producing coil or part, the magnetic circuits of both being coincident, the arrangement being preferably such that there shall be no transfer of energy in either direction between the two coils or parts.

Furthermore, in some cases, the balancing coil or conductor may be over-excited, that is, may produce ampere turns in excess of those produced by the inductance producing coil or part in the main circuit; and besides having a phase difference of 180 degrees between the currents in the main circuit and in the balancing coil circuit, the phase difference may be greater than or less than 180 degrees for certain purposes, the current in the balancing coil circuit being in such phase relation with respect to the main circuit current as to tend to produce in the main circuit a leading current.

While this in general is the nature of my invention several forms and modifications are hereinafter described.

For an illustration of some of the many forms my invention may take, reference is to be had to the accompanying drawings, in which:

Figure 1 is a diagram illustrating a known principle relating to reduction or elimination of inductive effects.

Fig. 2 is a diagram illustrating one mode of practising my invention.

Fig. 3 is a diagram illustrating another mode of practising my invention.

Fig. 4 is a diagram illustrating a further mode of practising my invention which is particularly suitable for increasing the power factor of an electric furnace circuit.

Fig. 5 is a diagram illustrating a mode of reducing the inductance of a circuit by operating upon that circuit at a distance from the coil or part which produces self-induction.

Fig. 6 is a diagram illustrating a mode for reducing or neutralizing the effect of a reactance coil under normal current conditions and automatically discontinuing the effect of the corrective or balancing coil when abnormal current conditions arise.

Referring to Fig. 1, A is an alternating current generator, or any other suitable source of alternating or fluctuating current connected in circuit through conductors 1 and 2 with the coil 3 which consists of a conductor or wire wound back on itself with the result that, at all instants the current in the outer conductor is in opposite direction to that in the inner conductor, the arrows showing directions of the current at a given instant, and the ampere turns produced by the one conductor are equal and opposite to those produced by the other conductor, and the coil as a whole will be non-inductive; there will be no resultant magnetism, since the magnetic force of the two halves are equal and opposite, and consequently annul each other.

Fig. 2 illustrates an arrangement of my invention for accomplishing this result by recourse to two separate coils, loops or circuits instead of by one wound back upon itself. Here $a$ is part of a circuit making a loop or wound in a coil and tending to produce inductance when traversed by alternating or fluctuating current from the source $A_1$. A second circuit $b$, of similar shape and lying close to the first circuit $a$ is traversed by current from a second source $A_2$ of alternating or fluctuating current of the same frequency as the current delivered by source $A_1$. The ampere turns of circuit $b$ is made as nearly as possible equal to the ampere turns of the circuit $a$. The currents in the two circuits are preferably exactly in phase with each other but flow in opposite directions at every instant, the relative directions being indicated by the arrows for a given instant. Under these circumstances any tendency of circuit $a$ to produce magnetic effects, and therefore inductance effects, is neutralized by the circuit $b$, and there will consequently be no inductance in either $a$ or $b$ and the power factor of both circuits will be unity.

Such an arrangement is useful in those cases where a part of the main circuit must for certain reasons be so arranged or disposed that incident to such arrangement or disposition inductance in the circuit will arise but which inductance produces undesirable effects, such as reduction of power factor. Then by the application of the corrective or balancing coil or circuit $b$ the inductance is reduced or the power factor increased without, however, changing the form or arrangement of the main circuit $a$. The number of turns in the coils or loops $a$ and $b$ need not be unity nor even equal to each other. The essential thing is that the ampere turns, that is, the current strength multiplied by the number of turns or convolutions, of the one coil or circuit shall be approximately equal to those of the other. Thus the circuit $a$ may have but a single turn carrying a heavy current while the circuit $b$ may have a plurality of turns or convolutions traversed by a current of proportionately smaller magnitude.

In Fig. 3, both the main coil and the corrective or balancing coil derive their current from the same source of current $A_1$, the main coil $a$ being shown interleaved or disposed between the halves or other parts of the balancing coil $b$, the arrows showing the direction of the current at a given instant, the direction of the current of the coil $a$ being at all times in opposite direction to the current of the coil $b$, the current waves in both coils preferably reaching their maxima and minima values at the same instants.

By the arrangements of Figs. 2 and 3 the power factor will be nearly unity and as near unity as is generally required, the difference from unity being due to magnetic leakage between the main and balancing coils, the magnetic flux in the metal of the coils and other minor effects. By over exciting the balancing coil, however, that is, by causing it to have more ampere turns than those in the loop or coil of the main circuit, I find that the power factor of the main circuit can be raised still higher.

And since the magnetic effect which causes the inductance is a function of the ampere turns and is balanced or neutralized when the ampere turns in the balancing coil are equal and opposite, as described in connection with Figs. 2 and 3, it becomes possible, by my invention, to have the main circuit $a$ consist of a few turns or even only a single turn or loop, traversed by relatively large current, while the balancing coil may consist of many turns carrying only a very small current, the balancing coil or circuit therefore consuming very little energy.

In some cases, as in some types of electric furnace circuits carrying large currents, it is not practicable to place the balancing coil over the whole of the loop of the main circuit, but only over a part of it. In such a case I find that by over excitation of the balancing coil the power factor can be raised still higher than when the balancing coil produces ampere turns to those of the main coil, loop or circuit. In this and any other case of over excitation of the balancing coil there will be some transfer of energy from the balancing coil to the main coil, loop or circuit.

In Fig. 4 the source $A_1$ supplies current to a circuit in which there is a loop $a$, which may be an electric furnace circuit, or any other device only a part of which is accessible for application to it of the balancing coil $b$, which is traversed by current from the source $A_2$, or which may be traversed by current from the same source $A_1$.

By my method of balancing or over-balancing an accessible part of a circuit it becomes possible to balance, in part at least, an inaccessible part of the circuit or part in which inductance is produced because of magnetic effects which are necessary or desired.

In Fig. 5 such an arrangement is shown. $a$ is either an inaccessible part of a circuit supplied by current from the source $A_1$, or it is a part whose function is to produce necessary or desired magnetic effects, which magnetic effects produce the self-induction or inductance which is to be counteracted in order to raise the power factor. In this case a separate loop or coil $c$ in circuit with $a$ has applied to it the balancing coil $b$ traversed by current from the source $A_2$. As stated the coil $b$ may be over-excited, and in addition the phase of the current in the coil $b$ may be so shifted, by any well known phase shifting device, to cause in the coil $c$ a current tending to lead. For this purpose the phase of the current in the coil $b$ may be adjusted to be ahead of or leading the phase of the current from the main circuit when the coil $b$ is not energized.

In Fig. 6 a source $A_1$ supplies current through the reactance coils $a$, $a$ to any translating devices $t$. This is a common form of distribution system. The purpose of the reactance coils is to cause them to prevent, because of their self-induction, extremely large current to flow in case of short circuit or the like at some point in the circuit to the right of them. But in normal operation these reactance coils introduce self-induction into the circuit and consequently reduce the power factor of the circuit. To these reactance coils are applied my corrective or balancing coils $b$, $b$ in the manner hereinbefore described, in the case illustrated the current being supplied to the coils $b$, $b$ from a secondary $s$ of the transformer whose primary is $p$, through a fuse $f$, or any other device which will interrupt the current in the coils $b$, $b$ when such current exceeds a predetermined value. In normal operation of the distribution system the inductance of the coils $a$, $a$ is neutralized and the power factor of the circuit improved. If now a short circuit or other condition should arise to the right of the coils $a$, $a$, an abnormally large current will momentarily flow and by transformer action produce in the circuit of the coils $b$, $b$ a current so large as to blow the fuse $f$, or actuate the equivalent device, to interrupt the circuit through the coils $b$, $b$ whereupon the reactance coils will offer great self-induction to the flow of current in the main circuit and prevent that current attaining too great a magnitude.

It will be understood with respect to Figs. 2, 4 and 5 that the current for the balancing coil $b$ may be derived from a transformer, synchronous dynamo or any other well-known device receiving energy either from the main circuit or from any other circuit or prime mover.

And in all the cases described it will be understood that the balancing coil may be over-excited and that the phase of the current in the balancing coil may be shifted or determined with respect to the phase of the current in the main circuit. And, as hereinbefore described, such phase shifting may be employed with over-excitation.

And inasmuch as magnetic leakage between the main and balancing coils should be reduced to a minimum, such coils may be disposed in any of the relations well understood in the art for reducing magnetic leakage, whether or not an iron core for the coils be employed.

Many methods of generating, supplying and regulating the current delivered to the balancing coil are common knowledge in the art to-day being far too numerous to illustrate and mention. It requires only the skill of one versed in the alternating current art to apply my invention to any specific case and, to supply and regulate the balancing current by any of the numerous methods well known in the art.

And it will be readily understood that while I have herein described my invention in connection with single phase currents, that it is equally applicable to any or each of the phases of a polyphase circuit.

While the applications of my invention hereinbefore referred to deal principally with electric power or distribution circuits, it is to be understood that my invention is of general application to any circuit carrying alternating, fluctuating or undulating current.

What I claim is:

1. In combination with a circuit normally traversed by an alternating working current producing, by a loop in said circuit, inductance which materially reduces the power factor of said circuit, a balancing coil or winding disposed in close proximity to said loop, and means for passing alternating current other than said working current through said balancing coil or winding of such strength and of such phase relation with respect to said normal working current in said loop that the resultant magnetic flux is substantially *nil*.

2. The combination with a source of alternating current, of an inductive loop in circuit with said source, and means for overcoming the inductance produced by said loop comprising a balancing coil or winding disposed in close proximity to said loop, and means for passing through said balancing coil or winding an alternating current of such phase relation with respect to the current in said loop and of such magnitude that said balancing coil is overexcited whereby the inductance of said loop is slightly overbalanced.

3. The combination with an alternating current circuit, of means therein producing inductance, an overexcited balancing coil associated with said means for increasing the power factor of said circuit, and a source of current external to said balancing coil in the circuit thereof.

4. In combination with a circuit normally traversed by an alternating working current producing inductance which materially reduces the power factor of said circuit when under useful working load, means for increasing the power factor of said circuit comprising a balancing coil, and means for passing through said balancing coil an alternating current other than said working current of the same frequency and of such strength and phase relation with respect to said normal working current in said circuit as to produce a magneto-motive-force materially decreasing the magnetic flux of the inductance in said circuit, whereby the power factor of said circuit is increased, the magnetic relation between said balancing coil and inductance being such that substantially no energy is transferred from either to the other by mutual induction.

5. In combination with a circuit normally traversed by an alternating working current producing inductance which materially reduces the power factor of said circuit when under working load, an auxiliary coil in close magnetic relation with a part of said circuit, means for passing through said auxiliary coil an alternating current other than said working current and of the same frequency and having such phase relation thereto and such number of ampere turns that the power factor of said main circuit is increased substantially to unity without substantial transfer of energy from said auxiliary coil to said circuit.

6. The combination with a main alternating current circuit having inductance reducing its power factor, a coil in said main circuit, an auxiliary coil in close magnetic relation with said coil and having different number of turns than said coil, means for passing through said auxiliary coil current of frequency equal to the frequency of the current in said main circuit and of such magnitude and phase relation that the resultant of the magneto-motive-forces of said coils is substantially *nil*, whereby the power factor of said main circuit is increased substantially to unity without substantial transfer of energy between said coils.

7. In combination with a main alternating current circuit having inductance reducing its power factor, an auxiliary coil in close magnetic relation with a part of said main circuit, means for separately exciting said auxiliary coil with a current of frequency equal to the frequency of the current in said main circuit and of such magnitude and phase relation that the power factor of said main circuit is increased substantially to unity without substantial transfer of energy between said auxiliary coil and said main circuit.

In testimony whereof I have hereunto affixed my signature in the presence of the two subscribing witnesses.

CARL HERING.

Witnesses:
 NELLIE FIELD,
 ALICE S. MARSH.